United States Patent
Swearingen et al.

(10) Patent No.: US 7,924,172 B1
(45) Date of Patent: Apr. 12, 2011

(54) SYNTHETIC VISION RUNWAY CORRECTIVE UPDATE SYSTEM

(75) Inventors: Paul A. Swearingen, Marion, IA (US); David A. Frank, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 650 days.

(21) Appl. No.: 11/895,365

(22) Filed: Aug. 24, 2007

(51) Int. Cl.
*G01C 21/00* (2006.01)

(52) U.S. Cl. ......... 340/972; 340/945; 340/971; 340/980

(58) Field of Classification Search ................. 340/972, 340/959, 945, 971, 973, 974, 975, 980
See application file for complete search history.

(56) References Cited

U.S. PATENT DOCUMENTS

| | | | | |
|---|---|---|---|---|
| 3,136,595 A | * | 6/1964 | Guarino et al. | 346/8 |
| 3,267,263 A | * | 8/1966 | Nelson et al. | 701/300 |
| 3,696,671 A | * | 10/1972 | Steigleder et al. | 73/178 R |
| 4,635,030 A | * | 1/1987 | Rauch | 340/945 |
| 6,977,608 B1 | * | 12/2005 | Anderson et al. | 342/26 B |
| 7,693,621 B1 | * | 4/2010 | Chamas | 701/16 |
| 2007/0005199 A1 | | 1/2007 | He | |
| 2007/0176794 A1 | | 8/2007 | Feyereisen | |

* cited by examiner

*Primary Examiner* — Daniel Wu
*Assistant Examiner* — Mark Rushing
(74) *Attorney, Agent, or Firm* — Matthew J. Evans; Daniel M. Barbieri

(57) ABSTRACT

A synthetic vision system (SVS) for an aircraft, including a user input device for receiving runway correction commands from a user. The runway correction commands are in response to discrepancies observed by the user between an observed runway position in the real world and a synthetic vision runway position depicted on an electronic display device. The user input device provides runway corrections. An SVS computer is operatively connected to the electronic display device for providing SVS image data to the electronic display device in response to received runway parameter data. A runway parameter server device (RPSD) is operatively connected to the user input device and to the SVS computer for receiving the runway corrections from the user input device and providing the runway parameter data, including any corrected data provided by the user, to the SVS computer. A runway parameter database is operatively connected to the RPSD for receiving correction data from the RPSD and providing corrected data to the RPSD. The user input device provides the capability of stewing the synthetic vision runway position to the observed real-world runway position when the synthetic vision runway position is observed to be misaligned, the corrected data being subsequently used to provide enhanced runway environment information for taxi operations.

15 Claims, 1 Drawing Sheet

SYNTHETIC VISION RUNWAY CORRECTIVE UPDATE SYSTEM

BACKGROUND OF THE INVENTION

1. Field of the Invention

The present invention relates generally to avionics systems for aircraft, and more particularly to a synthetic vision system (SVS) capability for slewing the synthetic vision runway position to the observed real-world runway position when the synthetic vision runway position is observed to be misaligned.

2. Description of the Related Art

Synthetic Vision Systems (SVSs) can provide pilots with early, precise indications of runway positions, especially origin and destination runways. SVSs are database-derived applications which utilize terrain, obstacle, and runway data, precise Global Positioning System (GPS) navigation, and integrity monitoring sensors to provide unrestricted, real-time, synthetic views of the external environment regardless of weather or time-of-day. These images may be presented on, for example, a primary flight display (PFD) or multifunction display (MFD), in either a head-down display (HDD) or head-up display (HUD) configuration.

SVS runway information presented to the flight crew is typically dependent upon a solution comparison between GPS aircraft position, attitude, and an independent database containing fixed runway parameters including, for example, latitudes, longitudes, elevations, widths, lengths, and headings that describe the physical characteristics of runways around the world.

A problem exists in the case where the aircraft taxis onto the actual runway and lines up on the centerline, only to find that the SVS runway depiction is displaced from real world centerline or heading due to parameters in the runway database that vary from the real world.

U.S. Pat. Publicn. No. 20070005199, entitled "System and Method for Enhancing Computer-Generated Images of Terrain On Aircraft Displays," by G. He, discloses a system and method for enhancing the visibility and ensuring the correctness of terrain and navigation information on aircraft displays, such as, for example, continuous, three-dimensional perspective view aircraft displays conformal to the visual environment. More specifically, an aircraft display system is disclosed that includes a processing unit, a navigation system, a database for storing high resolution terrain data, a graphics display generator, and a visual display. One or more independent, higher precision databases with localized position data, such as navigation data or position data is onboard. Also, one or more onboard vision sensor systems associated with the navigation system provides real-time spatial position data for display, and one or more data links is available to receive precision spatial position data from ground-based stations. Essentially, before terrain and navigational objects (e.g., runways) are displayed, a real-time correction and augmentation of the terrain data is performed for those regions that are relevant and/or critical to flight operations, in order to ensure that the correct terrain data is displayed with the highest possible integrity. These corrections and augmentations performed are based upon higher precision, but localized onboard data, such as navigational object data, sensor data, or up-linked data from ground stations. Whenever discrepancies exist, terrain data having a lower integrity can be corrected in real-time using data from a source having higher integrity data. A predictive data loading approach is used, which substantially reduces computational workload and thus enables the processing unit to perform such augmentation and correction operations in real-time. The '199 invention does not illustrate the use of a user input device for providing the capability of slewing the synthetic vision runway position to the observed real-world runway position when the synthetic vision runway position is observed to be misaligned, or corrected data being subsequently used to provide enhanced runway environment information for taxi operations.

SUMMARY OF THE INVENTION

In a broad aspect, the present invention is a synthetic vision system (SVS) for an aircraft, including a user input device for receiving runway correction commands from a user. The runway correction commands are in response to discrepancies observed by the user between an observed runway position in the real world and a synthetic vision runway position depicted on an electronic display device. The user input device provides runway corrections. An SVS computer is operatively connected to the electronic display device for providing SVS image data to the electronic display device in response to received runway parameter data. A runway parameter server device (RPSD) is operatively connected to the user input device and to the SVS computer for receiving the runway corrections from the user input device and providing the runway parameter data, including any corrected data provided by the user, to the SVS computer. A runway parameter database is operatively connected to the RPSD for receiving correction data from the RPSD and providing corrected data to the RPSD. The user input device provides the capability of slewing the synthetic vision runway position to the observed real-world runway position when the synthetic vision runway position is observed to be misaligned, the corrected data being subsequently used to provide enhanced runway environment information for taxi operations.

Unlike the system discussed above in U.S. Pat. Publicn. No. 20070005199, the present invention does not rely on additional databases or positional information, vision sensors, or other data which may be erroneous. Instead, the present invention provides the ability for the flight crew to directly affect any necessary corrections to the synthetic vision runway position via the user input device.

DETAILED DESCRIPTION OF THE INVENTION

Figure 1:
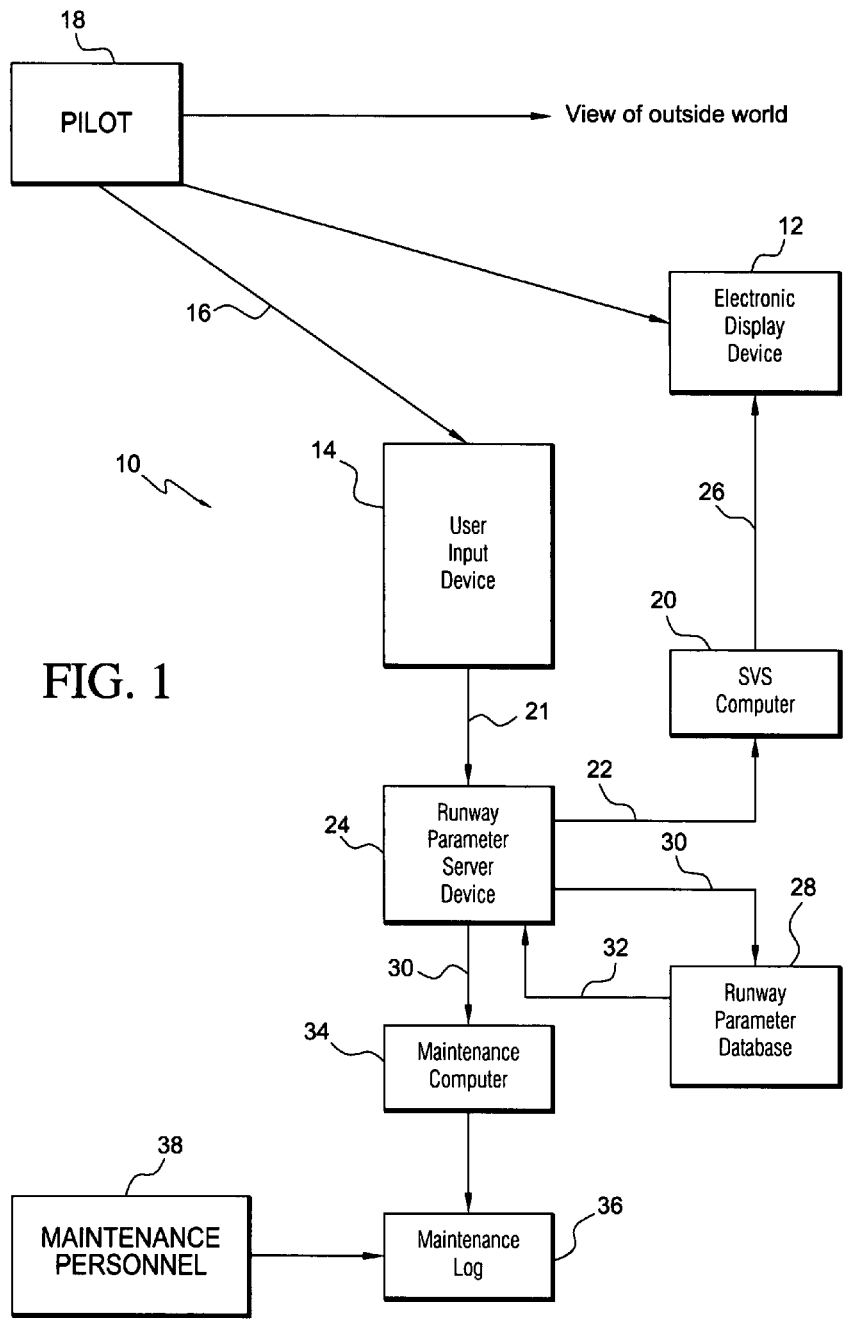
FIG. 1 is a block diagram illustrating the synthetic vision system (SVS) of the present invention.

Referring now to the drawings and the characters of reference marked thereon, FIG. 1 illustrates a synthetic vision system (SVS) for an aircraft in accordance with the principles of the present invention, designated generally as 10. The SVS 10 includes an electronic display device 12 used by the pilot for viewing the SVS scene. The electronic display device 12 may be, for example, a primary flight display, a multifunction display, a head-down display (HDD), a head-up display (HUD), or any other device suitable for presenting the SVS scene to the flight crew.

A user input device 14 receives runway correction commands 16 from a user/pilot 18. The runway correction commands 16 are in response to discrepancies observed by the user 18 between an observed runway position in the real world and a synthetic vision runway position depicted on the electronic display device 12. The user input device 14 may be a mechanical input device such as a joystick, trackball, mouse, button, switch, touch screen, knob, lever, slider, keypad, dial, or other suitable input device. Alternatively, it may be a suitable voice recognition device, such as the type manufactured by Rockwell Collins, Inc. or any number of commercially available systems, such as that produced by IBM Corp. trademarked ViaVoice® software; DRAGON® software by Nuance Communications, Inc.; KURZWEIL VOICE™ software and related products by Kurzweil Applied Intelligence, Inc.; and, SAPI (Speech Application Programming Interface) speech services integrated in the Microsoft Windows operating system speech recognition software. The user input device 14 provides runway corrections, denoted by numeral designation 21.

An SVS computer 20 is operatively connected to the electronic display device 12 for providing SVS image data 26 to the electronic display device 12 in response to received runway parameter data 22 from a runway parameter server device (RPSD) 24. The SVS computer 20 may be, for example, a model SVS-6000 manufactured by Rockwell Collins, Inc., or other suitable device.

The RPSD 24 is operatively connected to the user input device 14 and to the SVS computer 20 for receiving the runway corrections 21 from the user input device 14 and providing the runway parameter data 22, including any corrected data provided by the user, to the SVS computer 20. The RPSD 24 may be, for example, a file server such as an Integrated Flight Information System (IFIS) manufactured by Rockwell Collins, Inc., flight management computer or other suitable device.

A runway parameter database 28 is operatively connected to the RPSD 24 for receiving correction data 30 from the RPSD 24 and providing corrected data 32 to the RPSD. The runway parameter database 28 may be, for example, a suitable ARINC database such as an ARINC Specification 424 (ARINC-424) navigation system database or ARINC Specification 816 (ARINC-816) airport mapping database (AMDB).

The user input device 14 provides the capability of slewing the synthetic vision runway position to the observed real-world runway position when the synthetic vision runway position is observed to be misaligned. The corrected data is subsequently used to provide enhanced runway environment information for taxi operations.

In a preferred embodiment, this slewed runway position would then be substituted by the RPSD 24 within the runway parameter database 28, and be usable from that time forward for that specific aircraft until another runway parameter database is released and loaded. This parameter substitution is then recorded within a maintenance log 36 by a maintenance computer 34 and becomes a record within that aircraft that the runway parameter was updated by the flight crew and thus should be investigated for its accuracy in the released database.

A maintenance computer 34 is operatively connected to the RPSD 24 for receiving the correction data 30 from the RPSD 24 and logging the correction data for subsequent use. The maintenance log 36 is operatively connected to the maintenance computer 34 for receiving the logged correction data. The maintenance log 36 contains maintenance alerts or flags for aircraft maintenance action, and is utilized by maintenance personnel 38 for reporting and appropriate action. In this case, the maintenance log 36 may be utilized by maintenance personnel 38 or other cognizant persons for database correction and subsequent release to field aircraft.

Other embodiments and configurations may be devised without departing from the spirit of the invention and the scope of the appended claims.

The invention claimed is:

1. A synthetic vision system (SVS) for an aircraft, comprising:
    a) an electronic display device;
    b) a user input device configured to receive runway correction commands from a user, said runway correction commands being directly in response to discrepancies observed by said user between an observed runway position in the real world and a synthetic vision runway position depicted on said electronic display device, said user input device providing runway corrections;
    c) an SVS computer operatively connected to said electronic display device for providing SVS image data to said electronic display device in response to received runway parameter data;
    d) a runway parameter server device (RPSD) operatively connected to said user input device and to said SVS computer for receiving said runway corrections from said user input device and providing said runway parameter data, including any corrected data provided by the user, to said SVS computer; and,
    e) a runway parameter database operatively connected to said RPSD for receiving correction data from said RPSD and providing corrected data to said RPSD,
    wherein said user input device provides the capability of slewing the synthetic vision runway position to the observed real-world runway position by real-time modification of the runway position parameters when said synthetic vision runway position is directly observed by the user to be misaligned, said corrected data being subsequently used to provide enhanced runway environment information for taxi operations.

2. The synthetic vision system of claim 1, further comprising:
    a) a maintenance computer operatively connected to said RPSD for receiving said correction data from said RPSD and logging said correction data for subsequent use; and,
    b) a maintenance log operatively connected to said maintenance computer for receiving said logged correction data, said maintenance log being utilized by maintenance personnel for reporting and appropriate action.

3. The synthetic vision system of claim 1, wherein said user input device comprises a mechanical input device.

4. The synthetic vision system of claim 1, wherein said user input device comprises a voice recognition device.

5. The synthetic vision system of claim 1, wherein said runway parameter server device (RPSD), comprises an Integrated Flight Information System (IFIS) manufactured by Rockwell Collins, Inc.

6. The synthetic vision system of claim 1, wherein said runway parameter server device (RPSD), comprises a flight management computer.

7. The synthetic vision system of claim 1, wherein said electronic display device comprises a primary flight display for depicting terrain and runway position.

8. The synthetic vision system of claim 1, wherein said electronic display device comprises a multi-function display for depicting terrain and runway position.

9. The synthetic vision system of claim 1, wherein said electronic display device comprises a head-down display (HDD) for depicting terrain and runway position.

10. The synthetic vision system of claim 1, wherein said electronic display device comprises a head-up display (HUD) for depicting terrain and runway position.

11. The synthetic vision system of claim 1, wherein said runway parameter database comprises an ARINC Specification 424 (ARINC-424) navigation system database.

12. The synthetic vision system of claim 1, wherein said runway parameter database comprises an ARINC Specification 816 (ARINC-816) airport mapping database (AMDB).

13. The synthetic vision system of claim 2, wherein said maintenance log comprises a page within said maintenance computer which contains maintenance alerts or flags for aircraft maintenance action.

14. A method for providing enhanced runway environment information for taxi operations, comprising the steps of:
 a) receiving runway correction commands directly from a user utilizing a user input device, said runway correction commands being in response to discrepancies observed by said user between an observed runway position in the real world and a synthetic vision runway position depicted on an electronic display device, said user input device providing runway corrections;
 b) providing SVS image data to said electronic display device in response to received runway parameter data utilizing an SVS computer operatively connected to said electronic display device;
 c) receiving said runway corrections from said user input device and providing said runway parameter data, including any corrected data provided by the user, to said SVS computer, by utilizing a runway parameter server device (RPSD) operatively connected to said user input device and to said SVS computer; and,
 d) receiving correction data from said RPSD and providing corrected data to said RPSD utilizing a runway parameter database operatively connected to said RPSD,
 wherein said user input device provides the capability of slewing the synthetic vision runway position to the observed runway position by real-time modification of the runway position parameters when said synthetic vision runway position is directly observed by the user to be misaligned, said corrected data being subsequently used to provide enhanced runway environment information for taxi operations.

15. The method of claim 14, further comprising:
 a) receiving said correction data from said RPSD and logging said correction data for subsequent use, utilizing a maintenance computer operatively connected to said RPSD; and,
 b) receiving said logged correction data, said maintenance log being utilized by maintenance personnel for reporting and appropriate action, utilizing a maintenance log operatively connected to said maintenance computer.

* * * * *